Jan. 28, 1969   H. M. VALENTINE   3,424,064
CLAMP TYPE ROTOCHAMBER
Filed March 14, 1966

INVENTOR
*Harry M. Valentine*

BY *Scrivener, Parker, Scrivener & Clarke*

ATTORNEYS

United States Patent Office 3,424,064
Patented Jan. 28, 1969

3,424,064
CLAMP TYPE ROTOCHAMBER
Harry M. Valentine, Elyria, Ohio, assignor to Bendix-Westinghouse Automotive Air Brake Company, Elyria, Ohio, a corporation of Delaware
Filed Mar. 14, 1966, Ser. No. 534,212
U.S. Cl. 92—101                                         1 Claim
Int. Cl. F01b 19/00; F16b 39/28, 1/00

ABSTRACT OF THE DISCLOSURE

Mounting means for a thin walled non-pressure plate of an expansible chamber motor of the type having a cylindrical side wall and a flat end wall, said walls being right-angularly related, the mounting means comprising a pair of diametrically disposed clip members each having right angularly-related side and end wall portions conforming to the shape of the side and end walls of the plate and respectively engaging the latter, the side edges of the side and end walls of the clip member being interconnected by webs and with the side wall of the clip member being welded to said cylindrical side wall, together with bolt means having a head part welded to the end wall of the clip member and extending outwardly of the plate for securing the motor to a support.

---

This invention relates to mounting means and more particularly to mounting means for detachably connecting a normally closed chamber to a rigid support structure.

Though it will be quite apparent that the present invention has utility in a variety of fields, it will be hereinafter described as employed in mounting on to a vehicle an expansible chamber motor of the type employed in fluid pressure operated braking systems. Those skilled in the art usually refer to such brake operating motors as "brake chambers" and hereinafter such motors will be referred to in these terms. As those skilled in the art are aware, brake chambers are removed from and installed on vehicles as units with each chamber usually comprising pressure and non-pressure plates having an annular flange which clamps between them the outer periphery of a diaphragm and over which an annular clamping ring is tightened to insure that the flanges are in sealing engagement with the diaphragm. The diaphragm is urged in the direction of the pressure plate by a spring loaded push rod, the latter extending through an end wall of the non-pressure plate for connection to brake actuator means.

Because there is no access to the interior of a brake chamber and because the plates are thin walled, it has heretofore been customary to provide on the interior of the non-pressure plate heavy metallic bosses which are an integral part of the inner surface of the non-pressure plate and these are drilled and threaded through the end wall of the non-pressure plate from the exterior thereof for the reception from the outside of studs which are then engaged with the mounting holes in a fixed part of the vehicle and receive lock washers and nuts in the usual manner. While the heavy bosses welded to the bottom plate provided a satisfactory means for the stud attachments, they contributed very little to the strength of the bottom plate and none to the strength of the side wall.

Though the above described arrangement for mounting brake chambers to a fixed support on a vehicle is entirely satisfactory from a structural point of view, it is nevertheless expensive to manufacture both in time and material and it is the broad object of the present invention to provide an improved attachment means for brake chambers or similar thin walled hollow articles which are light weight, strong, and inexpensive.

More particularly, it is an object of the invention to provide mounting means for hollow brake chambers or the like wherein instead of a heavy metallic drilled and threaded bosses there are substituted clip means which may be welded to the interior of the thin walled, dish or cup shaped, non-pressure plate of the brake chamber and which in turn may have welded thereto a headed bolt member having a shank which extends through aligned apertures in the clip and the end wall of the non-pressure plate for the reception of a nut and washer in the same manner as the studs of the prior art.

Other objects and their attendant advantages will become apparent as the following detailed description is read in conjunction with the accompanying drawings wherein.

Figure 1:
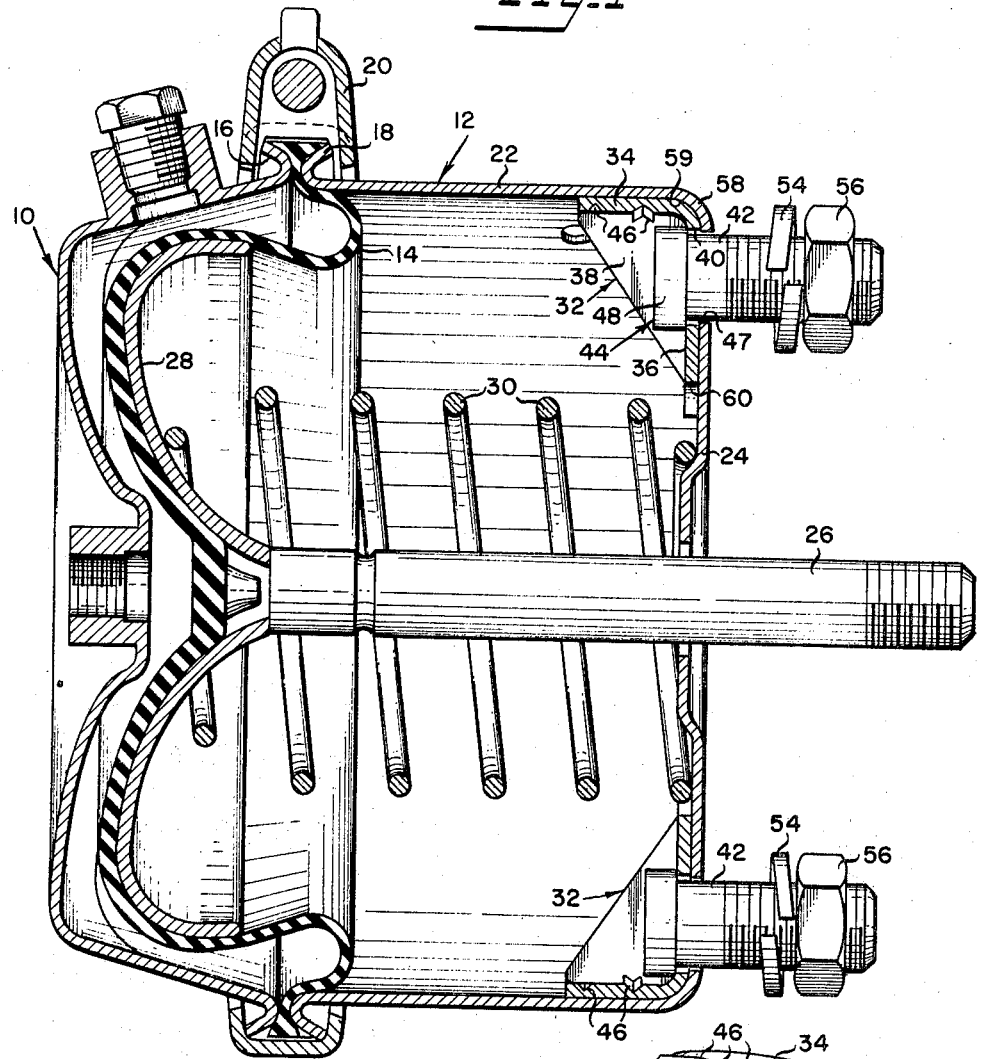
FIG. 1 is a vertical cross-sectional view of a brake chamber incorporating the mounting means of the present invention.

Referring now to the drawings and particularly to FIG. 1 there is illustrated there a brake chamber comprising a pressure plate 10, a non-pressure plate 12 and a diaphragm 14 between the plates which is sealed about its periphery between flanges 16, 18 on the respective plates 10, 12 and which are clamped together by a clamping ring 20 of conventional construction. The non-pressure plate 12 is dish or cup shaped and composed of integral side and end walls 22, 24 and extending centrally through the end wall 24 is a push rod 26 carrying at its inner end a push plate 28 which is urged into abutting relationship with the diaphragm 14 by a return spring 30 which operates between the end wall 24 of the non-pressure plate and the push plate 28 as shown.

Figure 2:
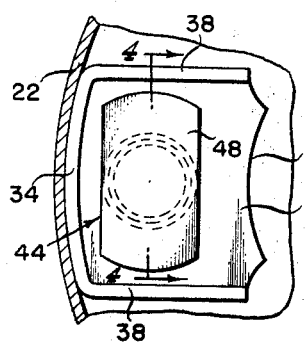
FIG. 2 is a broken end elevation of a portion of the interior of a non-pressure plate of the chamber of FIG. 1 showing the mounting means of the present invention.
Figure 3:
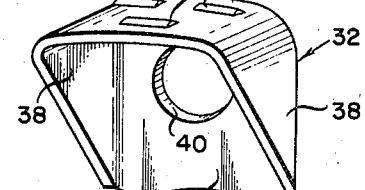
FIG. 3 is a perspective view of a clip comprising a part of the present invention.

In accordance with the present invention, the means for reinforcing the mounting means of the brake chamber for attachment onto a supporting part of the vehicle comprises in part a clip 32 of heavy gauge stamped sheet material which, as can be seen in FIGS. 2 and 3, has an arcuate side wall 34 adapted to engage the cylindrical side wall 22 of the brake chamber as indicated in FIG. 2. The clip 32 has an integral flat end wall 36 which engages the adjacent part of the end wall 24 of the non-pressure plate 12 and integrally joining the end and side walls 34, 36 are integral webs 38 which form with the side and bottom walls a unitary structure of great strength. As can be seen in FIG. 3, the clip is pre-drilled or punched out to provide an opening 40 for the reception of the shank 42 of a bolt 44 described in detail hereinafter.

During fabrication of the clip 32 there are pre-stamped into the side wall 34 thereof a plurality of sharp, laterally spaced, elongated ridges 46 which are adapted to be moved into tight abutment with the side wall 22 of the non-pressure plate by a resistance welding tool with the ridges serving to concentrate welding heat sufficient to locally melt the ridges and effect a weldment of the clip to the interior of the side wall 22 of the plate 12. Thereafter the end wall 24 is drilled co-axially with the hole 40 in the clip or the end wall may have been pre-drilled prior to the positioning of the clip to provide a hole 47 therethrough.

Figure 4:
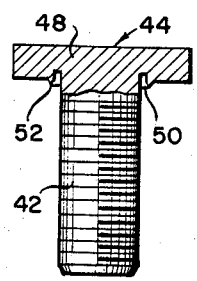
FIG. 4 is a side elevational view of a bolt member constructed in accordance with the present invention with a part thereof shown in cross-section.

As best illustrated in FIGS. 2 and 4 of the drawings, the bolt 44 is provided with a substantially rectangular or T-shaped head 48 whose underside is concentrically grooved and machined as at 50 in FIG. 4 to provide ridges 52 having a sharply pointed lower edges so as to provide welding beads such that when the bolt shank 42 is inserted through the holes in the clip and the end wall 24 of the plate 22 the welding ridges 52 may be moved into tight engagement with the end wall 36 of the clip by a resistance welding tool to effect a weldment of the head with the clip in a known manner.

After the non-pressure plate, clip and bolt have been permanently joined together in the described manner the brake chamber may be assembled and the chamber as a unit may be mounted on or dismounted from a fixed part of the vehicle by merely inserting the bolt shanks 42, which are now for all intents and purposes an integral part of the non-pressure plate, through suitable holes in a supporting member for the reception of lock washers 54 and nuts 56 in the conventional manner.

With particular reference to FIG. 1 it will be noted that the arcuate corner 58 of the clip 32 is rounded to the same degree of curvature as the corner 59 joining the side and end walls of the brake chamber and the respective inner and outer sides of the respective side and end walls of the non-pressure plate and clip have the same degree of angularity with respect to each other. Thus the clip nests in the corner snugly to afford an extremely strong reinforcement for the brake chamber and mounting bolt which is more effective than the solid metallic boss arrangement previously employed. It will be noted that the end wall 36 of each clip is scalloped as at 60 in FIG. 2 to afford clearance for the large convolutions of the spring 30 when this is compressed against the end wall upon a brake application.

Though the present invention has been described in its particular application to the mounting of a brake chamber, it will be apparent to those skilled in the art that the invention is not necessarily limited to such use but may be employed wherever it is necessary to mount a normally closed thin walled, hollow body onto a supporting structure. It will of course be apparent that the mounting means of the invention is susceptible of a variety of changes and modifications without, however, departing from the scope and spirit of the appended claim.

What is claimed is:

1. A fluid pressure actuator having interconnected pressure and non-pressure plates housing a pressure responsive member dividing the actuator into a pressure chamber and an atmospheric chamber, said non-pressure plate being cup-shaped and including a cylindrical thin walled side wall portion and a thin walled flat end wall portion arranged in right-angular relationship, a return spring interposed between said pressure responsive member and said end wall portion, a pair of diametrically opposed mounting means for mounting said end wall portion to a fixed support, each of said mounting means comprising a clip member having side and end walls integrally joined together in right-angular relationship with the side wall conforming to the curvature of said cylindrical side wall portion and with the end wall conforming to said flat end wall portion, the side and end walls of the clip member respectively abutting said side and end wall portions of the cup-shaped non-pressure plate, weldment means integrally and rigidly connecting the side wall of the clip member to the cylindrical side wall portion of the non-pressure plate, said end wall of the clip member extending a substantial distance toward the center of the end wall portion of the non-pressure plate to provide a bearing surface of substantial area and the innermost edge of said end wall being scalloped to afford clearance for the convolutions of said spring when the latter is compressed against said end wall portion, said end wall of the clip member and said end wall of the non-pressure plate having aligned openings therethrough, a bolt having a head part and a shank part, said head part being substantially rectangular with one of the longer sides positioned closely adjacent and substantially parallel to the side wall of the clip member and said shank part extending outwardly through said openings, integral webs interconnecting the side edges of the side and end walls of the clip member, and other weldment means integrally and rigidly connecting said head part to the end wall of the clip member.

References Cited

UNITED STATES PATENTS

| 3,151,525 | 10/1964 | Dobrikin et al. | 92—101 |
| 3,331,291 | 7/1967 | Rumsey | 92—101 |
| 1,286,746 | 12/1918 | Otte | 287—189 |
| 2,372,772 | 4/1945 | Ellis et al. | 151—41 |
| 2,908,310 | 10/1959 | Grey | 151—41 |
| 3,020,987 | 2/1962 | Schaunte | 287—189 |
| 3,157,428 | 11/1964 | Kishline | 151—41 |

EDWARD C. ALLEN, *Primary Examiner.*

U.S. Cl. X.R.

151—41.7; 287—189.36